United States Patent
Cerqueira et al.

(10) Patent No.: US 7,276,210 B2
(45) Date of Patent: Oct. 2, 2007

(54) STRIPPING APPARATUS AND PROCESS

(75) Inventors: Henrique Soares Cerqueira, Rio de Janeiro (BR); Cláudia M De Lacerda Alvarenga Baptista, Rio de Janeiro (BR); José Mózart Fusco, Rio de Janeiro (BR)

(73) Assignee: Petroleo Brasileiro S.A. -Petrobras, Rio de Janerio (BR)

( * ) Notice: Subject to any disclaimer, the term of this patent is extended or adjusted under 35 U.S.C. 154(b) by 584 days.

(21) Appl. No.: 10/643,968

(22) Filed: Aug. 20, 2003

(65) Prior Publication Data

US 2005/0040075 A1    Feb. 24, 2005

(51) Int. Cl.
- *B01J 8/18* (2006.01)
- *B32B 5/02* (2006.01)
- *C10G 35/10* (2006.01)

(52) U.S. Cl. ............ 422/144; 422/139; 422/145; 208/161; 208/153; 208/164; 208/113; 208/154; 261/114.5; 202/239

(58) Field of Classification Search ............ 422/144, 422/143, 147; 208/150, 113; 202/239; 261/114.5

See application file for complete search history.

(56) References Cited

U.S. PATENT DOCUMENTS

| | | | |
|---|---|---|---|
| 3,728,239 A | 4/1973 | Mc Donald | |
| 4,500,423 A * | 2/1985 | Krug et al. | 208/161 |
| 4,721,603 A | 1/1988 | Krug et al. | |
| 4,738,829 A | 4/1988 | Krug | |
| 4,927,606 A | 5/1990 | Cetinkaya et al. | |
| 4,933,150 A * | 6/1990 | Haddad et al. | 422/147 |
| 5,015,363 A | 5/1991 | Cetinkaya | |
| 5,531,884 A | 7/1996 | Johnson et al. | |
| 5,549,814 A | 8/1996 | Zinke | |
| 5,716,585 A | 2/1998 | Senegas et al. | |
| 5,910,240 A | 6/1999 | Senior et al. | |
| 6,224,833 B1 | 5/2001 | Rall | |

(Continued)

FOREIGN PATENT DOCUMENTS

EP    187032 A1    12/1985

OTHER PUBLICATIONS

J.W. Wilson, "Fluid Catalytic Cracking", Chapter 3, pp. 116-117, 1997.

*Primary Examiner*—Glenn Caldarola
*Assistant Examiner*—Kaity Handal
(74) *Attorney, Agent, or Firm*—Sughrue Mion Pllc (57) ABSTRACT

A stripping apparatus for desorbing gases from solid particles through which flows counter-currently a stripping fluid is described, which comprises a series of sets of at least two parallel, segmented, baffle plates each, with the segmented baffles being oriented so that the rows are offset relative to rows of other levels, where the thickness and separation of said sets of baffles is so dimensioned as to reduce coalescence of the size of the formed bubbles and optimize the hydrocarbons desorption from said fluidized solid particles. The solid particles are mainly spent catalyst particles from a FCC process. The stripping process to be carried out in a fluidized bed comprises contacting the spent catalyst with a stripping fluid that flows upwardly in the fluidized bed in the form of bubbles. Adsorbed hydrocarbons present in the spent catalyst are transferred from the catalyst emulsion that flows downwardly to the upwardly moving bubbles, so as to promote the efficient recovery of cracked products.

39 Claims, 3 Drawing Sheets

INVENTION

U.S. PATENT DOCUMENTS 6,248,298 B1 6/2001 Senior et al.
7,022,221 B1* 4/2006 Hedrick .................... 208/150
2002/0008052 A1 1/2002 Hendrick
2002/0094313 A1* 7/2002 Lu et al. .................... 422/216

* cited by examiner

FIG. 1
FIG. 1A

INVENTION

PRIOR ART

STRIPPING APPARATUS AND PROCESS

FIELD OF THE INVENTION

The present invention relates to a stripping apparatus and process, more specifically, to a stripping apparatus useful for gas-solid separation processes, such as fluid catalytic cracking unit (FCC), the apparatus being provided with at least two sets of parallel, segmented baffle plates placed in series, the design and arrangement of which secures improved contact between gas and spent catalyst solid. As a result, catalyst recirculation zones associated to dead zones are reduced and consequently the time required for removal of extractable hydrocarbons is reduced. According to the stripping process of the invention, the spent FCC catalyst is made to counter-currently contact the bubbles of a stripping fluid that flows upward the fluidized bed. Adsorbed hydrocarbons on the spent catalyst are transferred from the catalyst emulsion that flows downwardly to the upwardly flowing bubbles, so as to promote the recovery of cracking products.

BACKGROUND INFORMATION

The purpose of the catalyst stripper of the FCC unit is to remove hydrocarbons adsorbed on the interior of spent catalyst before the regeneration step. Basically, the FCC catalyst stripper is a moving fluidized bed with counter-current contacting between steam and hydrocarbon-rich catalyst. The majority of the stripping steam normally flows upward in the form of bubbles. Hydrocarbons are adsorbed on the surface of the catalyst pores and migrate through the pores and later through the interstitial spaces between particles.

The stripping process is basically a mass transfer process, being normally carried out in a fluidized bed (dense phase), where the catalyst or "emulsion" made up of catalyst and hydrocarbons counter-currently meets a gas flux, normally steam, that strips hydrocarbons occluded in the catalyst. This way, stripping is essentially a gas-solid extraction. Depending on the operational conditions, some cracking, dealkylation and condensation reactions may also occur. Strippable hydrocarbons not desorbed in the stripping step are directed to the regenerator, causing product waste. Besides, the higher the hydrogen/carbon ratio in the hydrocarbon mixture carried to the regenerator, higher are the resulting regeneration temperatures. High regeneration temperatures result in deep catalytic deactivation and limit catalyst circulation, leading to losses in conversion and valuable product yields. According to the practiced temperature levels, even the stripper itself may be jeopardized in view of the metallurgical limit.

The efficiency of the catalyst stripper has a significant impact on the overall FCC unit profitability. Poor stripping reduces the amount of recoverable product. Perhaps, more importantly, poor strippping can cause excessively high regenerator temperatures, which reduce catalyst circulation, unit severity and conversion. Higher regenerator temperatures also lead to faster catalyst deactivation and increased mechanical wear on the unit. Industrial experience has shown that improving a poorly operating FCC catalyst stripper can increase a refiner's FCC unit conversion by 2 volume % and overall profits by about US$ 0.15 per barrel of feed.

Improved stripper efficiency is directly transferred to the unit operation, reducing the entrainment of high Hydrogen/Carbon ratio hydrocarbons to the regenerator and consequently, reducing the delta coke and the heat produced during coke burning. Upon decreasing temperature of the regenerator dense phase, it is possible to obtain higher catalyst circulation, leading to higher conversion or allowing increased flow rate of processed feed.

Besides, the negative impact of the increase in regeneration temperature on catalyst deactivation should be mentioned. High temperatures increase vanadium mobility and promote the formation of acidic species, which attack the catalyst structure, leading to permanent activity loss.

As regards the stripper role, it should be mentioned that any modification introduced in the unit aiming at reducing delta coke, such as for example, new feed-dispersion technologies, might not attain the desired goals if the stripper cannot withstand the corresponding circulation increase. This way, a low efficiency stripper may reduce the potential benefits of new technologies.

Stripper performance is a function of several operational variables and design parameters. However, obtaining optimum-stripping performances intrinsically depends on the adequate selection of internals used in the stripping apparatus. Internals modification is especially important in already existing units, those being limited by the feed flow rate and having maximum circulation.

In order to improve steam-catalyst contacting and increasing stripping efficiency, the strippers of an industrial FCC unit contain internals. The most commonly used internal devices are baffles. Since optimization of stripper internals is the most interesting alternative to attain best stripper performance, and in view of the low efficiency of these devices, efforts are being endeavored to increase the efficiency of it.

U.S. Pat. No. 3,728,239 teaches an improved process of gas-solid contact when treating finely divided solids with a gas in a vertical cylindrical vessel. The vessel is provided with a plurality of vertically spaced, downwardly sloping baffles, which preferably overlap one another, and with a substantially vertical impingement plate mounted directly above a downwardly sloping baffle. It is alleged that stripping efficiency is substantially improved if the catalyst mass is alternately compacted and expanded while surrounded by the stripping medium. The suggested apparatus is particularly suitable for stripping residual hydrocarbons from catalyst used in fluid catalytic cracking processes.

In order to improve stripping efficiency, U.S. Pat. No. 4,721,603 teaches, for a unit devoid of closed cyclones, modifications in the upper part of the stripper, such modifications involving baffles and being able to lead to a partial cyclone effect so as to improve stripping efficiency.

U.S. Pat. No. 5,910,240 teaches improved designs for the stripper section of an FCC unit. The improved stripper section of the said US patent contains a plurality of vanes used to impart rotational movement to the FCC catalyst system as it traverses through the stripper section vertically by way of gravity and horizontally (radially) by way of the slanted surfaces of the stripper trays. According to said document, the improved tray design adds a third dimension to the flow of catalyst through the stripper section by providing rotational flow means on the surface of the slant trays to impart a rotational flow, i.e., angular motion, to the catalyst as it traverses the stripper section. The other two dimensions are the vertical flow of the catalyst through the stripper, due to gravity, and the horizontal or radial flow of the catalyst due to the slanted nature of the tray. The angular/rotational movement of the spent catalyst improves catalyst/steam contacting and improves stripping efficiency. In the proposed configuration, one of the advantages of the concept of U.S. Pat. No. 5,910,240 is that a large stripper surface is open, allowing the passage of pieces of refractory and/or coke from the separator vessel.

U.S. Pat. No. 5,531,884 teaches a fluidized catalytic cracking process (FCC) and apparatus using a catalyst stripper with slant trays or shed trays having "downcomers". Downcomers are vertical catalyst/gas contacting elements that provide a vertical, counter current region for catalyst/stripping vapor contact. It is alleged that downcomers improve stripping effectiveness by preserving the static head of pressure existing under the tray.

U.S. Patent Application Publication 2002/0008052A1 teaches a baffle-style stripper for an FCC process having a complete or nearly complete coverage of stripping openings over the sloped surface of the baffle that will provide improved stripping efficiency and catalyst flux through the stripper. The alleged advantage is to prevent choking of stripper flow by the restriction of stripping gas flow to narrow open areas between the sloped baffles. The small (3.8 cm) openings are able to produce a small penetration jet in the catalyst descending from the top of the baffle. As it is believed that the mass transfer occurs in the region next to the jet and in the bubbles formed by the jet, the higher efficiency results from the small bubbles formed by the small jets. Cold-flow test results provided in said US application confirm improved efficiency of the so-modified baffles as compared to downcomers of the above cited U.S. Pat. No. 5,531,884 for a wide range of catalyst flux, chiefly for high catalyst fluxes of the order of 683,480 kg/h/m$^2$.

U.S. Pat. No. 5,549,814 teaches the use of a grid arrangement that provides increased contacting of stripping fluid and catalyst through multiple levels of stripping grids while using a configuration that permits access through the stripper vessel for maintenance and inspection. The stripper grids also have orifice openings to redistribute stripping fluid at each level of stripping grid and increase contact between catalyst and stripping fluid. The distance between the grids is in the range of 24"-48" so as to obtain the desired efficiency. One drawback of the concept of this U.S. patent stems from the fact that not having free areas may cause that coke pieces or any other debris may be stuck in the stripper.

U.S. Pat. No. 5,716,585 teaches the use of various packing elements that occupy the whole stripping section, that make possible the radial distribution of catalyst and steam, so as to improve stripping efficiency.

More recently, U.S. Pat. No. 6,244,833 teaches the use of a structured packing, this increasing the effective volume of the stripper, the residence time and consequently the stripping efficiency. According to said patent, a gas-solid fluidized bed is formed within a contacting element having pairs of planar portions arranged in intersecting planes, each planar portion being formed by one or more webs and one or more open slots adjacent each web, the webs and slots being arranged such that a web in one of the planar portions intersects a slot in the paired planar portion. The fluidized bed is made up of catalyst particles fluidized by a gas stream, such as in a catalyst stripper and/or regenerator in a FCC system. The structured packing that is suggested in this US patent leads to the same drawbacks as those of small open area that can be easily blocked by refractory and coke pieces or debris.

A further approach to improving stripping efficiency is taught by European publication EP 0187032A1, whereby stripping is made in two steps, with a first conventional step using baffles and a second step where a portion of the regenerated hot catalyst is admixed to the catalyst effluent from the first stripping step, leading to a temperature around 80° C. higher than the temperature of the riser top. A higher temperature would favor hydrocarbon desorption from the catalyst surface.

Aiming at minimizing the use of stripping steam as well as increasing the overall process efficiency, U.S. Pat. Nos. 4,927,606 and 5,015,363 teach steam distribution throughout several injection points, situated below each baffle. This device eliminates stagnated areas and secures a well-distributed, counter current flow to the catalyst steam flow. Experimental data indicate that the proposed device allows a reduction from 1.5 kg steam/catalyst ton to 0.7 kg steam/catalyst ton, keeping constant the regenerator dense phase temperature.

State-of-the-art documents indicate that in known strippers, that is, disc and donut devices, optimized steam-catalyst contact is not favored at the desired extent. The area above the baffle is a stagnated zone where hydrocarbons desorption from catalyst is of low efficiency. These devices favor bubble coalescence, forming large bubbles, those large bubbles disturbing the fluid dynamics, this in turn rendering flow and steam-catalyst contact more difficult.

Normally, to increase stripper efficiency, one can increase the stripper steam rate using an efficient steam distributor as well as increase the steam rate. However, even if an efficient steam distributor (pipe-grid) is used, this cannot be of much help because of the above-mentioned coalescence effect. Due to backpressure, the increased steam rate on its turn increases steam entrainment, which can limit the maximum possible steam rate.

Therefore, in spite of the technological progress in this field, the technique still needs improvements in the spatial arrangement of the stripper baffles, that is, segmented, parallel baffles arranged in sequence, the segment number as well as the plate thickness being dimensioned so as to reduce the coalescence of the bubble size of the stripping fluid as well as an homogeneous fluid dynamic distribution of the catalyst flux, turbulence throughout the stripping vessel being secured, said arrangement in a stripper apparatus of an FCC unit being described and claimed in the present application.

SUMMARY OF THE INVENTION

Broadly, the present invention relates to an apparatus for stripping fluidized solid particles counter-currently with a gaseous stripping fluid, said apparatus comprising an approximately vertical stripping chamber a fluid-distributing device for feeding a gaseous stripping fluid; a grid to collect refractory and coke debris, the chamber comprising a zone of downward circulation of the suspended particles counter-currently to said fluid, said apparatus further comprising a series of sets of at least two parallel, segmented baffle plates each, with the segments being oriented so that the rows are offset relative to the next levels rows, where the thickness and separation of said sets of baffles is so dimensioned as to reduce bubble coalescence, therefore optimizing hydrocarbon desorption from said fluidized solid particles.

And the process for stripping hydrocarbons from fluidized solid particles comprises, after contacting a particulate catalyst with hydrocarbons, disengaging hydrocarbon vapors from said catalyst particles to yield catalyst particles having adsorbed hydrocarbons thereon, passing said catalyst particles having adsorbed hydrocarbons downwardly through a vertical stripping chamber past a series of sets of at least two parallel, segmented, baffle plates each, with the segments being oriented so that the rows are offset relative to the next level rows, where the thickness and separation of said sets of baffles is so dimensioned as to reduce coalescence of the formed bubbles and optimize hydrocarbons desorption from the catalyst, by virtue of the parallel segmentation the catalyst flowing homogeneously vertically as well as horizontally so as to prevent stagnation zones, and withdrawing stripped catalyst particles form the bottom of said stripping zone, distributing stripping fluid along the stripper apparatus comprising said segmented sets of baffles while reducing bubble coalescence; and withdrawing stripping fluid and recovered hydrocarbons from the top of said stripping zone.

Therefore the present invention provides an apparatus for stripping fluidized solid particles counter-currently with a gaseous stripping fluid, said apparatus comprising a sets of series of at least two parallel, segmented baffle plates where said sets are so spatially arranged as to reduce coalescence of the formed bubbles and optimize hydrocarbon desorption from said solid particles.

The present invention provides further a process for stripping hydrocarbons adsorbed on solid particles comprising passing said particles counter-currently with a gaseous stripping fluid in a vertical stripping chamber past said set of series of at least two parallel, segmented, baffle plates where said sets are so spatially arranged that by virtue of the parallel segmentation of said series of baffles the catalyst flows homogeneously vertically as well as horizontally so as to prevent stagnation zones.

DETAILED DESCRIPTION OF THE PREFERRED MODES

One aspect of the present invention is an apparatus for stripping hydrocarbons adsorbed on fluidized solid particles, such as spent catalysts used in a FCC unit.

A further aspect of the invention is a stripping process for stripping such adsorbed hydrocarbons from fluidized solid particles such as those of a spent catalyst used in a FCC unit.

At the end of the riser, it is important to make a quick separation between the catalyst and the product vapors. This will minimize cracking reactions in the reactor vessel. The current state-of-the-art in riser terminations is closed cyclones. These systems minimize reactor dilute phase residence time by connecting the riser cyclone outlets directly to the inlets of the reactor cyclones. Catalyst from the cyclones flows directly into the reactor bed. This catalyst flow does, however, carry some product vapors into the bed. These vapors are recovered in the stripper.

Figures 1, 1A:
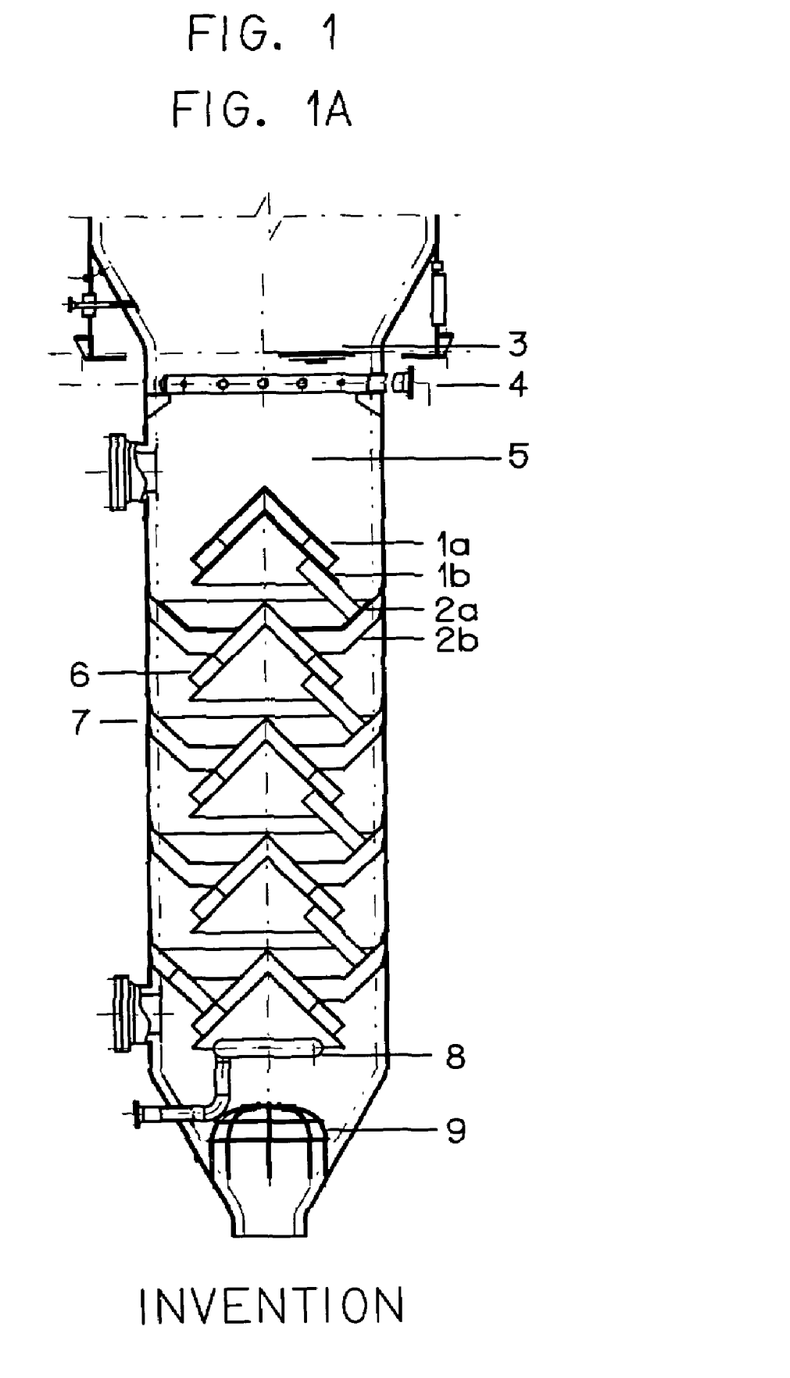
FIG. 1 attached is a set of views of a stripper apparatus and segmented baffles according to the invention.
FIG. 1A is a general cross-sectional view of the stripper and segmented baffles.

As generally represented in FIG. 1A, a stripper apparatus according to the invention for stripping hydrocarbons from fluidized solid particles counter-currently with a gaseous stripping fluid, said apparatus being part of a separator vessel (not represented) comprises:

a) an approximately vertical stripping chamber 5;

b) several pairs of parallel, segmented 1a, 1b and 2a, 2b baffles;

c) a fluid-distributing device 8 for feeding the gaseous stripping fluid;

d) a grid 9 to collect refractory and coke debris, said chamber 5 comprising a zone of downward circulation of the suspended particles counter-currently to said fluid, with the segmented baffles 1a, 1b, and 2a, 2b being oriented so that the rows are offset relative to rows of other levels, where the thickness and separation of said sets of baffles is so dimensioned as to reduce coalescence of formed bubbles so as to optimize the hydrocarbons desorption from said fluidized solid particles.

The stripper apparatus of the invention may additionally include a pipe-grid 4 for feeding the pre-stripping gaseous fluid.

Further, fluid-distributing device 8 may be a steam-ring 8.

Alternatively, steam-ring 8 may be replaced by a pipe-grid 8.

The fluidized solid particles are generally spent catalyst particles from a FCC process.

The set of series of at least two segmented, baffle plates each includes baffles 1a, 1b, In, where n is at most 3, arranged in sequence.

The segment number as well as the range thickness is dimensioned so as to reduce coalescence of the stripping fluid bubble, which is normally steam.

Also, a homogeneous fluid dynamic distribution of the catalyst flux is made possible, turbulence occurring throughout stripping chamber 5.

Impinging pairs of baffles are oriented so as to be set off relative to the next row of baffles, allowing the gaseous flow to meet an impinging surface able to break the stripper fluid bubbles and therefore enhance the entrapped hydrocarbons recovery.

Useful for the present invention are sets of from four to fifteen parallel baffles, according to the particular features of the FCC unit as well as the stripper dimensions.

Figure 1B:
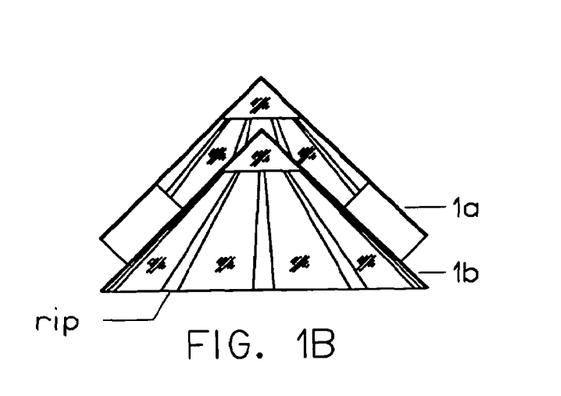
FIG. 1B is a detailed view of one pair of segmented disc baffles.
Figure 1C:
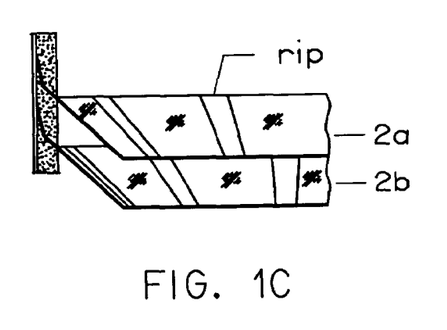
FIG. 1C is a detailed view of one pair of segmented donut baffles.
Figure 1D:
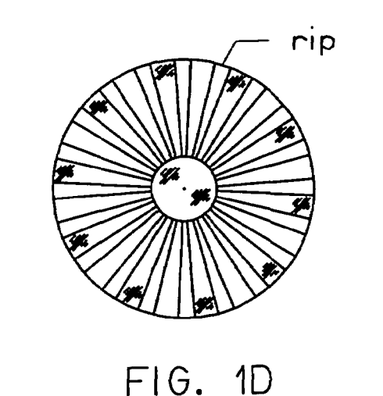
FIG. 1D is a top view of a pair of segmented disc baffles.
Figure 1E:
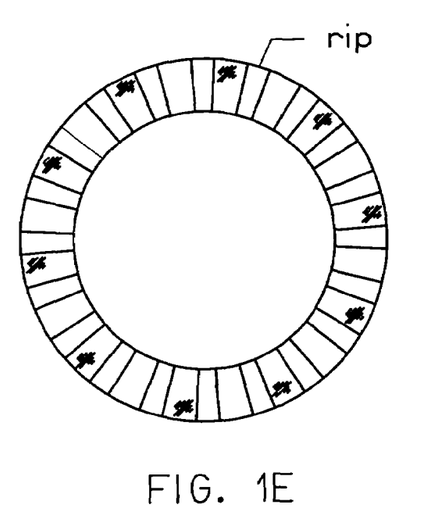
FIG. 1E is a top view of a pair of segmented donut baffles.

As illustrated in FIG. 1A, one embodiment of the invention comprise sets of baffles of the disc and donut type, with at least two parallel and segmented disc 6 and donut 7 baffles. The catalyst level 3 is also illustrated in FIG. 1A. A detailed front view of a pair of segmented discs 6 is illustrated in FIG. 1B. The top view of the same pair 6 may be seen in FIG. 1D, where the hatched area stands for the solid area while the dotted line is for the projection of the lower disc rips. A detailed front view of a pair of segmented donuts 7 is illustrated in FIG. 1C. The top view of the same pair 7 may be seen in FIG. 1E, where the hatched area stands for the solid area while the dotted line stands for the projection of the lower donut rips. The rips are preferably equally spaced, but not limited to it.

The upper disc 1a of FIG. 1A is supported by the lower disc 1b while this latter is supported by the upper donut 2a, and successively. All the donuts are supported by the stripper wall as shown in FIG. 1C.

It should be borne in mind that the first pairs of discs 1a, 1b and donuts 2a, 2b, are preferably refracted, to avoid erosion due to catalyst friction.

It should be noted that the concept of the invention of parallel segmented devices is not limited to the described/illustrated disc and donut arrangement, other arrangements being equally possible, for example, common baffles or any other geometry.

Figure 2:
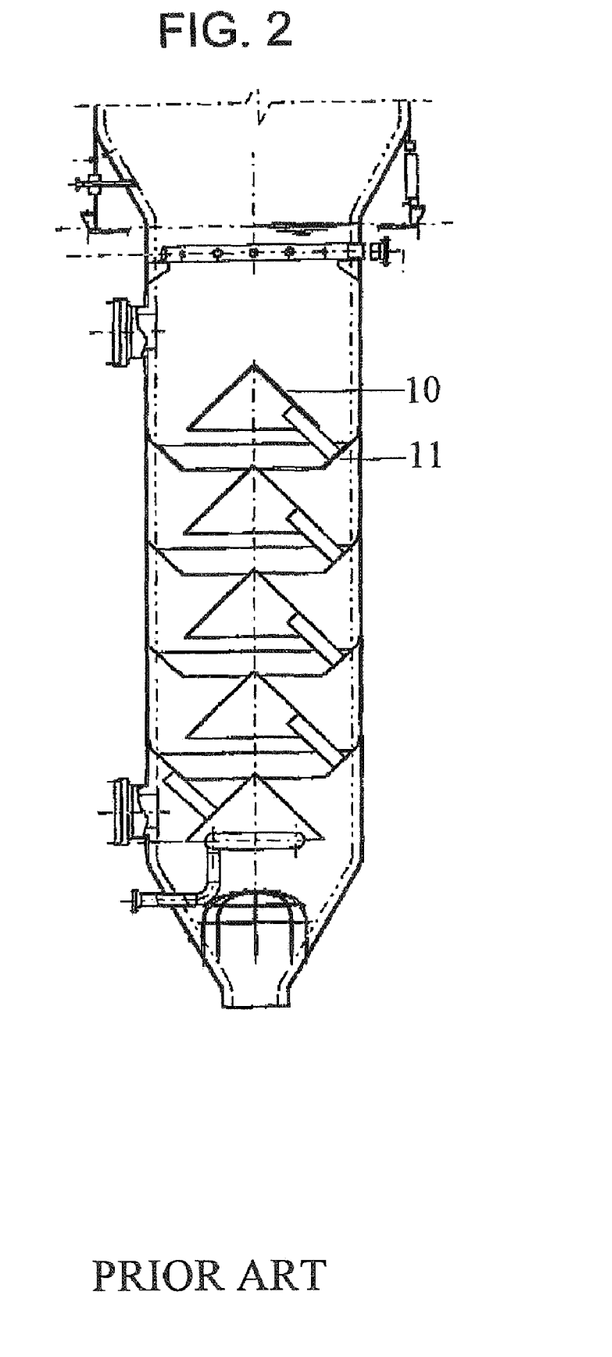
FIG. 2 attached is a prior art baffle according to Wilson, Joseph W. "Fluid Catalytic Cracking—Technology and Operation", page 117, FIG. 3.21, Pennwell Publishing Co. (1997).

FIG. 2 is a prior art stripping apparatus, provided with the conventional disc 10 and donut 11 baffles.

The sets of segmented, parallel baffles are affixed to the chamber so as to promote the horizontal flow of catalyst, this promoting flux distribution.

The baffles' arrangement provides a cross-sectional free area of from 20% to 80% of the total area, with the rips free area in the range of from 5% to 20%, more preferably of from 8% to 12% of the cross sectional area.

Considering the project parameters as a function of the stripping chamber diameter ($\Phi$), the resulting rip width in the first baffle of the at least two baffles of each set is of from $0.012\Phi$ to $0.18\Phi$, preferably of from $0.018\Phi$ to $0.12\Phi$.

The rip width of the second baffle of the at least two baffles of each set is larger, in the range of from $0.024\Phi$ to $1.62\Phi$, preferably in the range of from $0.074\Phi$ to $0.36\Phi$.

In case the set of baffles comprises more than two baffles, the same dimensions as used for a set of two baffles should be repeated.

The number of baffles in a set is limited by the inner space of the stripping chamber. Said inner space should not be too crowded, so normally sets of two or three baffles are preferred.

In order to make the horizontal displacement of the solid particles easier, for example, spent catalyst particles, it is preferred that the baffles are parallel or present a small relative slope between each other. In case of slant baffles, the slope to the horizontal should be of from 20° to 40°.

The set of baffles according to the invention allows a homogeneous catalyst distribution and excellent contact between steam and the gaseous phase, with many vertical counter-current areas, so that dead areas are avoided.

The angle between the chamber wall and the impinging baffle (or donut) may vary of from 30° to 60°, and is preferably of 45°.

In order to avoid by pass, a set of segmented baffles containing of from 2 to 6 baffles, preferably 4 baffles, is alternated with a set of at least two segmented discs.

These wall baffles may be separated from a distance that may vary of from $0.012\Phi$ to $0.54\Phi$, preferably of from $0.036\Phi$ to $0.12\Phi$.

As for the discs, the first disc of the at least two discs of the set should have rips of from $0.003\Phi$ to $0.080\Phi$, preferably of from $0.008\Phi$ to $0.032\Phi$. The second disc should be provided with larger rips, of from $0.006\Phi$ to $0.72\Phi$, preferably of from $0.008\Phi$ to $0.096\Phi$. The distance between discs is of from $0.003\Phi$ to $0.24\Phi$, preferably of from $0.008\Phi$ to $0.24\Phi$, preferably $0.008\Phi$ to $0.032\Phi$.

The stripping apparatus is dimensioned according to state-of-the-art principles.

The proposed arrangement of set of baffles significantly improves the recovery of valuable hydrocarbons, with the consequent increase in the profitability of the industrial unit, which ultimately results in a higher amount of energy obtained by amount of produced $CO_2$ in the regenerator flue gas.

The inventive arrangement improves the recovery of adsorbed products on the catalyst, with the benefit that such recovered products are no longer directed to the regenerator and burned there, yielding coke and increasing the regeneration temperature, with the ensuing loss of catalyst circulation and conversion.

It should also be understood that the inventive arrangement of sets of segmented baffles is not limited to a FCC process, being applied to any process aiming at separating gas from solid in a fluidized bed that flows counter-currently to a stripping fluid.

And the process for stripping hydrocarbons from fluidized solid particles in a stripping zone associated with a fluid catalytic cracking reactor wherein said stripping zone removes hydrocarbons from a continuously circulating stream of fluidized particulate catalyst by contact with a stripping gas for stripping hydrocarbons from fluidized solid particles comprises:

a) contacting a particulate catalyst with hydrocarbons;

b) disengaging hydrocarbon vapors from said catalyst particles to yield catalyst particles having adsorbed hydrocarbons thereon;

c) passing said catalyst particles having adsorbed hydrocarbons downwardly through a vertical stripping chamber past a series of sets of at least two parallel, segmented, baffle plates each, with the segments being oriented so that the rows are offset relative to rows of the next level, where the thickness and separation of said sets of baffles is so dimensioned as to reduce coalescence of the size of the formed bubbles and optimize hydrocarbons desorption from the catalyst, by virtue of the parallel segmentation the catalyst flowing homogeneously vertically as well as horizontally so as to prevent stagnation zones;

d) withdrawing stripped catalyst particles form the bottom of said stripping zone;

e) distributing stripping fluid along the stripper apparatus comprising said segmented sets of baffles while reducing coalescence of bubbles; and f) Withdrawing stripping fluid and recovered hydrocarbons from the top of said stripping zone.

If the apparatus and process of the invention are directed to an FCC process, the catalyst may include a zeolite and alumina porous solid, but not limited to same.

Other porous solids are for example, adsorbents.

The process of the invention is not limited to fluid catalytic cracking, being directed as well to any gas-solid separation process.

The apparatus of the invention, provided with the parallel, segmented baffles of the invention may be distinguished from state-of-the-art proposals in that it does not make use of any structured packing such as the packing described in U.S. Pat. No. 6,224,833, nor does it make use of the packing elements taught in U.S. Pat. No. 5,716,585.

Further, contrary to what is taught in European publication EP 01877032A1, stripping is carried out in one single step.

Also, the segments of baffle plates (or discs) have a larger passage area than that of the perforated baffle plates of US Application 2002/0008052 or downcomers as in U.S. Pat. No. 5,531,884.

The improved efficiency of the segmented baffles to be installed in a stripping apparatus according to the invention is basically due to the better distribution of the catalyst and the stripping fluid, as well as in the lower bubble size of the latter, and not to the rotational movement suggested in U.S. Pat. No. 5,910,240.

Steam may be injected only in the bottom of the stripper, dispensing with the use of multiple injections such as in U.S. Pat. No. 4,927,606.

Finally, since the segmented, baffle plates do not occupy the whole diameter of the vertical chamber of the stripping apparatus, it is possible to work with a lower separation between the several elements of each set than the separation taught in state-of-the-art processes such as that of U.S. Pat. No. 5,549,814, this leading to more comfort for inspecting and maintenance access.

Thus, the improved efficiency of the present set of segmented, baffle plates results from the homogeneous distribution of flux and ability of reducing coalescence of steam bubbles, keeping as such the small bubbles formed in the pipe grid, besides improving the steam distribution and flow.

The segmented baffles of the invention allow three-dimensional flow of catalyst particles, this improving steam-catalyst contact as well as eliminate dead zones and consequently increasing stripping inventory and residence time in stripper.

A further advantage of the inventive apparatus is an enlargement of the operational window concerned with the steam rate. This is because the invention provides a larger open area for steam flow, which allows to operating with higher steam rates without having the steam entrainment to the regenerator occurring in prior art devices.

A large area of the stripper is kept open, this in turn allowing the passage of refractory pieces and/or coke from the separator vessel.

We claim:

1. An apparatus for stripping hydrocarbons from fluidized solid particles counter-currently with a gaseous stripping fluid, said apparatus being part of a separator vessel and comprising:
    a) an approximately vertical stripping chamber;
    b) several sets of segmented, parallel baffles arranged in rows on an axis;
    c) a fluid-distributing device for feeding a gaseous stripping fluid; and
    d) a grid to collect refractory and coke debris,
    said stripping chamber comprising a zone of downward circulation of the suspended particles counter-currently to said fluid, with the sets of segmented baffles being oriented so that rows of a level of segmented, parallel baffles are offset relative to rows of another level of segmented, parallel baffles on said axis, where the thickness and separation of said sets of baffles is so dimensioned as to reduce coalescence of the formed bubbles and optimize the hydrocarbons desorption from said fluidized solid particles,
    wherein said several sets of segmented, parallel baffles arranged in rows comprise a first set of baffles, each baffle within the first set having a first geometry, followed by a second set of baffles, each baffle within the second set having a second geometry, and wherein said first geometry and said second geometry are not the same.

2. An apparatus according to claim 1, further comprising a pipe-grid for feeding a gaseous pre-stripping fluid located in the upper part of the stripper apparatus.

3. An apparatus according to claim 1, wherein the fluid-distributing device is a steam-ring.

4. An apparatus according to claim 1, wherein the fluid-distributing device is a pipe-grid.

5. An apparatus according to claim 3, wherein the fluid distributed by said device is steam.

6. An apparatus according to claim 1, wherein each set comprises two segmented, baffle plates arranged in sequence.

7. An apparatus according to claim 1, wherein each set comprises three segmented, baffle plates arranged in sequence.

8. An apparatus according to claim 1, wherein impinging sets of baffles are oriented so as to be offset relative to the next set of baffles, allowing the gaseous flow to meet an impinging surface able to reduce coalescence of the stripping fluid bubbles.

9. An apparatus according to claim 1, wherein the sets of segmented baffles include from four to fifteen sets of parallel baffles.

10. An apparatus according to claim 1, wherein the segmented sets of baffles comprise alternating baffles of the disc and donut type.

11. An apparatus according to claim 10, wherein any upper disc is supported by the next lower disc, said next lower disc being in turn supported by an upper donut, said upper donut is supported by a lower donut, before "and successively" and successively.

12. An apparatus according to claim 10, wherein first sets of discs and donuts are refracted.

13. An apparatus according to claim 1, wherein the baffles are arranged such that a cross-sectional free area of said stripping chamber is from 20% to 80% of a total cross-sectional area of said stripping chamber, and wherein rips of the baffles represent from 5% to 20% of the total cross-sectional area.

14. An apparatus according to claim 13, wherein the rips represent from 8% to 12% of the total cross-sectional area.

15. An apparatus according to claim 1, wherein rip width in the first baffle of the at least two baffles of each set is from $0.012\Phi$ to $0.18\Phi$, and wherein $\Phi$ represents the stripping chamber diameter.

16. An apparatus according to claim 15, wherein the rip width in the first baffle of the at least two baffles of each set is from $0.018\Phi$ to $0.12\Phi$.

17. An apparatus according to claim 1, wherein rip width of the second baffle of the at least two baffles of each set is from $0.024\Phi$ to $1.62\Phi$, and wherein $\Phi$ represents the stripping chamber diameter.

18. An apparatus according to claim 17, wherein the rip width of the second baffle of the at least two baffles of each set is from 0.074 to $0.36\Phi$.

19. An apparatus according to claim 1, wherein the baffles are parallel to the horizontal.

20. An apparatus according to claim 1, wherein the baffles are slant baffles, with a slope to the horizontal of from 20° to 40°.

21. An apparatus according to claim 1, wherein the angle between the chamber walls and an impinging baffle/donut is from 30° to 60°.

22. An apparatus according to claim 21, wherein the angle between the chamber walls and the impinging baffle/donut is 45°.

23. An apparatus according to claim 1, wherein a set of segmented baffles containing from 2 to 6 baffles, is alternated with a set of at least two segmented discs.

24. An apparatus according to claim 1, wherein said baffles are separated by a distance of from $0.012\Phi$ to $0.54\Phi$, and wherein $\Phi$ represents the stripping chamber diameter.

25. An apparatus according to claim 24, wherein said distance is from $0.036\Phi$ to $0.12\Phi$.

26. An apparatus according to claim 1, wherein the segmented sets of baffles comprise a set of a series of at least two segmented baffles of the disc type, wherein rips of the first disc of the at least two discs of the set are from $0.003\Phi$ to $0.080\Phi$, and wherein $\Phi$ represents the stripping chamber diameter.

27. An apparatus according to claim 26, wherein the rips of the first of the at least two discs of the set are from $0.008\Phi$ to $0.032\Phi$.

28. An apparatus according to claim 1, wherein the segmented sets of baffles comprise a set of a series of at least two segmented baffles of the disc type, wherein rips of the second disc of the at least two discs of the set are from 0.006Φ to 0.72Φ, and wherein Φ represents the stripping chamber diameter.

29. An apparatus according to claim 28, wherein the rips of the second of the at least two discs are from 0.008Φ to 0.096Φ.

30. An apparatus according to claim 1, wherein the segmented sets of baffles comprise baffles of the disc type, wherein the distance between discs is from 0.003Φ to 0.24Φ, and wherein Φ represents the stripping chamber diameter.

31. An apparatus according to claim 30, wherein the distance between discs is from 0.008Φ to 0.24Φ.

32. An apparatus according to claim 31, wherein the distance between discs is from 0.008Φ to 0.032Φ.

33. An apparatus according to claim 1, wherein said apparatus is directed to a gas-solid separation process.

34. An apparatus according to claim 33, wherein the gas-solid separation process is part of a fluid catalytic cracking process.

35. A process for stripping hydrocarbons from fluidized solid particles in a stripping zone associated with a fluid catalytic cracking reactor wherein said stripping zone removes hydrocarbons from a continuously circulating stream of fluidized particulate catalyst by contact with a stripping gas, said process comprising:
  a) contacting a particulate catalyst with hydrocarbons;
  b) disengaging hydrocarbon vapors from said catalyst particles to yield catalyst particles having adsorbed hydrocarbons thereon;
  c) passing said catalyst particles having adsorbed hydrocarbons downwardly through a vertical stripping chamber past a series of sets of at least two parallel, segmented baffle plates on an axis, with the segments being oriented so that rows of a level of parallel, segmented baffles are offset relative to rows of another level of parallel, segmented baffles on said axis, where the thickness and separation of said sets of baffles is so dimensioned as to reduce coalescence of the formed bubbles and optimize hydrocarbons desorption from the catalyst, by virtue of the parallel segmentation the catalyst flowing homogeneously vertically as well as horizontally so as to prevent stagnation zones;
  d) withdrawing stripped catalyst particles from the bottom of said stripping zone;
  e) distributing stripping fluid along the stripper apparatus comprising said segmented sets of baffles while reducing coalescence of bubbles; and
  f) withdrawing stripping fluid and recovered hydrocarbons from the top of said stripping zone,
  wherein said series of sets of at least two parallel, segmented baffle plates each comprises a first set of baffles, each baffle within the first set having a first geometry, followed by a second set of baffles, each baffle within the second set having a second geometry, and wherein said first geometry and said second geometry are not the same.

36. A process according to claim 35, wherein the particulate catalyst is any porous solid catalyst.

37. A process according to claim 35, wherein the particulate catalyst is a zeolite-containing FCC catalyst.

38. An apparatus according to claim 4, wherein the fluid distributed by said device is steam.

39. An apparatus according to claim 13, wherein rips in a baffle of a set are offset relative to rips in the next baffle of the set.

* * * * *